(12) United States Patent
Lasserre et al.

(10) Patent No.: US 10,360,666 B2
(45) Date of Patent: Jul. 23, 2019

(54) METHOD AND APPARATUS FOR PROCESSING HIGH DYNAMIC RANGE IMAGES

(71) Applicant: InterDigital VC Holdings, Inc., Wilmington, DE (US)

(72) Inventors: Sebastien Lasserre, Cesson-Sevigne (FR); Fabrice Leleannec, Cesson-Sevigne (FR); Philippe Bordes, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 135 days.

(21) Appl. No.: 15/666,747

(22) PCT Filed: Jan. 26, 2016

(86) PCT No.: PCT/EP2016/051596
§ 371 (c)(1),
(2) Date: Aug. 2, 2017

(87) PCT Pub. No.: WO2016/124451
PCT Pub. Date: Aug. 11, 2016

(65) Prior Publication Data
US 2019/0156467 A1    May 23, 2019

(30) Foreign Application Priority Data
Feb. 6, 2015   (EP) .................................... 15305183

(51) Int. Cl.
G06T 5/00      (2006.01)
G06T 5/40      (2006.01)

(52) U.S. Cl.
CPC ............... G06T 5/009 (2013.01); G06T 5/40 (2013.01); *G06T 2207/10016* (2013.01); *G06T 2207/20208* (2013.01)

(58) Field of Classification Search
None
See application file for complete search history.

(56) References Cited

U.S. PATENT DOCUMENTS 9,781,417 B2 *  10/2017  Ninan ................. H04N 19/647
2003/0235342 A1 * 12/2003  Gindele .............. H04N 1/4074
                                                                   382/260

(Continued)

FOREIGN PATENT DOCUMENTS

EP         1857976        11/2007
EP         214444         1/2010

OTHER PUBLICATIONS

PCT International Search Report dated Apr. 28, 2016.

(Continued)

*Primary Examiner* — Delomia L Gilliard
(74) *Attorney, Agent, or Firm* — Brian J. Dorini; Xiaoan Lu (57) ABSTRACT

An input HDR image may be represented using an SDR image and a modulation value. For the SDR image to be viewable and representative of the HDR image, we propose a mid-tone optimization technique to calculate the modulation value. In particular, we use two conditions when deriving the modulation value: (1) the blacks are not clipped down to zero too aggressively; and (2) the number of codewords in the SDR image used to represent the mid-tone range of the HDR image is maximized. The modulation value can further be clipped to avoid over-shooting in both very dark images and very bright images. Temporal stabilization can also be used to smooth temporal variations of the luminosity in the SDR video. After the modulation value is determined, the SDR image can be obtained based on the HDR image and the modulation value.

20 Claims, 7 Drawing Sheets

(56) References Cited

U.S. PATENT DOCUMENTS

| | | | | |
|---|---|---|---|---|
| 2004/0057632 A1* | 3/2004 | Gindele | ........... | G06T 5/009 |
| | | | | 382/274 |
| 2005/0117799 A1* | 6/2005 | Fuh | ........... | G06T 5/009 |
| | | | | 382/169 |
| 2007/0268534 A1* | 11/2007 | Duan | ........... | G06T 5/007 |
| | | | | 358/520 |
| 2009/0027558 A1* | 1/2009 | Mantiuk | ........... | H04N 1/6027 |
| | | | | 348/673 |
| 2015/0003749 A1 | 1/2015 | Kim et al. | | |
| 2018/0005358 A1* | 1/2018 | Lasserre | ........... | H04N 19/136 |
| 2018/0152684 A1* | 5/2018 | Wozniak | ........... | H04N 7/147 |
| 2018/0152686 A1* | 5/2018 | Wozniak | ........... | H04N 7/15 |

OTHER PUBLICATIONS

Takao Jinno et al, High Contrast HDR Video Tone Mapping Based on Gamma Curves, IEICE Transactions on Fundamentals of Electronics. Communications and Computer Sciences, Engineering Sciences Society, Tokyo, JP, vo 1, E94A, No. 2, Feb. 1, 2011; pp. 525-532, XP001560934, abstract.

Reinhard et al, Photograohic tone reporduction for digital images, ACM Transations on Graphics (TOG) ACM, US, vol. 21, No. 3, Jul. 1, 2002, pp. 267-276, abstract.

\* cited by examiner

METHOD AND APPARATUS FOR PROCESSING HIGH DYNAMIC RANGE IMAGES

This application claims the benefit, under 35 U.S.C. § 365 of International Application PCT/EP2016/051596, filed Jan. 26, 2016, which was published in accordance with PCT Article 21(2) on Aug. 11, 2016, in English, and which claims the benefit of EP Application, Serial No. 15305183.4, filed on Feb. 6, 2015.

TECHNICAL FIELD

This invention relates to a method and an apparatus for processing high dynamic range images, and more particularly, to a method and an apparatus for converting images from one dynamic range to another dynamic range.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The dynamic range of luminance in a picture can be defined as a ratio between the highest luminance value of an image and the lowest luminance value of the image:

$$r = bright/dark$$

where "bright" denotes the highest luminance value of the image and "dark" denotes the lowest luminance value of the image. The dynamic range "r" is generally expressed as a number of power of two, called f-stops or equivalent stops. For instance, a ratio 1000 is about 10 f-stops, which is the typical dynamic range of standard non-HDR videos, also called SDR (Standard Dynamic Range) videos or equivalently LDR (Low Dynamic Range) videos.

The dynamic range of an image can be very high, and may be well beyond the range that can be represented by standard image formats, such as the 8-10 bits gammatized formats used in broadcasting or PC imaging. Here the term "gammatized formats" refer to image formats represented in a non-linear domain. For example, linear components, such as, but not restricted to, RGB and Y, are transformed into the gammatized domain by using a non-linear function that can be a power function, a logarithm or an OETF (Opto-Electronic Transfer Function) such as those defined in the ITU-R Recommendation BT.709/BT.2020.

Different images may be represented by different formats, and have different dynamic ranges. For instance, we consider an image I whose luminance is expressed linearly in nits by an element Y. The value of Y may correspond to the true luminosity of a captured scene in a so-called "scene reference" format (i.e., in the file format Y=1 corresponds to 1 nit of luminance in the captured scene, Y=x corresponds to x nits). The range of Y may cover all possible luminance ranges of image scenes captured by a camera, for instance. By varying the optics (filters, aperture) and/or sensors (exposure time, ISO) of a camera, the range of scenes can be very high. Very dark scenes like telescope observation (e.g., using long exposure time) or very bright scenes like sunsets (e.g., using very small aperture and strong filters) are both possible, leading to very dark and very bright pictures. Consequently, the dynamic range may be well over 15 f-stops.

The value of element Y may also be used to represent the luminosity provided by a display on which the image has been post-produced in a so-called "display reference" format (i.e., in the file format Y=1 corresponds to 1 nit of luminance rendered by a display used for the grading, Y=x corresponds to x nits). The dynamic range provided by the "display reference" format is usually much lower than that of a "scene reference" format. This results in a more limited dynamic range and peak luminance of the associated pictures. For example, these images may have a dynamic range of 15 f-stops and a peak luminance of 1000 nits, as those defined in some restricted broadcasting-oriented specification.

Often an image or video of a high dynamic range is called a High Dynamic Range (HDR) image or video. The exact dynamic range that an HDR video application supports may vary. For example, the SMPTE (Society of Motion Picture and Television Engineers) defines a Perceptual Quantizer EOTF (Electro-Optical Transfer Function) also known as PQ EOTF (defined in SMPTE ST. 2084) non-linear transfer curve, preferably coded on 12 bits, which may code the luminance on the range from 0.005 nits to 10000 nits (nit is a term referring to candela per square meter units or $cd/m^2$, a unit for light intensity), leading to a ratio of 2 million or about 21 f-stops. Practically, first deployments of HDR at home may be expected to be TV sets providing not much more than a peak brightness of 1000 nits and a dynamic range of 15 f-stops, preferably on 10 bits data format if possible. This restricted HDR is also referred to as Extended Dynamic Range (EDR). Typically, an SDR video has a bit depth of 8 or 10 bits, and an HDR video has a bit depth of 10 bits and higher. For example, an SDR video can be a 4:2:0 Y'CbCr 10-bit video, and an HDR video can be a PQ OETF Y'CbCr 12-bit video.

In the present application, for ease of notation, we classify HDR videos into "EDR videos" and "strictly HDR" videos, where "EDR videos" refer to the videos with a dynamic range between 10 and 15 f-stops, and "strictly HDR" videos refer to those above 15 f-stops, as illustrated in TABLE 1.

TABLE 1

|     |              | Dynamic range              |
| --- | ------------ | -------------------------- |
| SDR |              | r ≤ 10 f-stops             |
| HDR | EDR          | 10 f-stops < r ≤ 15 f-stops |
|     | Strictly HDR | r > 15 f-stops             |

In order for HDR images to be displayed on SDR devices such as TV sets or computer monitors, the images should be converted to become viewable (i.e., in a format compatible with the display device, and preserve the overall perceived brightness and colorfulness of the HDR videos) on the SDR devices. We denote by R the data range on which the luminance Y should be mapped, for instance R=[0,255] for an 8-bit SDR format or R=[0,1023] for a 10-bit SDR format with a standard EOTF defined by ITU-R BT.709 or BT.2020.

An "absolute" mapping function $$\pi: linear\ domain \rightarrow R,$$

which maps a value from a linear domain to a data range R, can be used for the conversion. Here "absolute" should be understood as that a mapped value corresponds to a unique input value, i.e., the mapping function is not adapted to the content. Such an "absolute" mapping, which maps luminance Y from a linear domain to the data range R does not always work well. For example, it may map very dark scenes uniformly to zero and very bright scenes to the upper bound (e.g., 255 or 1023) of the data range supported by the output device.

SUMMARY

According to an aspect of the present principles, a method for converting a first image to a second image is presented, wherein the first image is an HDR (High Dynamic Range) image and the second image is an SDR (Standard Dynamic Range) image, comprising: determining a mid-tone level of the first image; determining a modulation value responsive to a mapping function and the mid-tone level of the first image; and converting the first image to the second image responsive to the modulation value and the mapping function, wherein the converting comprises scaling down the first image based on the modulation value, and wherein the scaled first image is converted to the second image based on the mapping function.

The mid-tone level may be determined based on a black level and a white level. For example, the mid-tone level may be determined as one of (1) a geometric mean and (2) a logarithm mean of the black level and the white level. The black level and the white level may be determined based on a histogram, and the modulation value may be determined such that the conversion of the first image preserves information in a black area of the first image in the second image. A codeword in the second image corresponding to the black level in the first image may exceed a threshold.

When the first image is one of a plurality of images included in a video, the determination of the modulation value may be performed for each of the plurality of images, wherein the modulation values for the plurality of images are temporally smoothed.

The determination of the modulation value may substantially maximize a number of codewords used in the second image to represent a range around the mid-tone level in the first image. The determination of the modulation value may be responsive to a steepest slope of the mapping function.

The mapping function may be formulated as $g_{Ba}(z) = M_{SDR} f(z)/f(P/Ba)$, wherein P is an upper bound of a dynamic range for the first image, Ba is the modulation value, $M_{SDR}$ is an upper bound of a data range of the second image, and f( ) is a function. The f( ) function may be an Slog function.

According to another aspect of the present principles, an apparatus for converting a first image to a second image is presented, wherein the first image is an HDR (High Dynamic Range) image and the second image is an SDR (Standard Dynamic Range) image, comprising: a communication interface configured to access the first image; and one or more processors configured to determine a mid-tone level of the first image, determine a modulation value responsive to a mapping function and the mid-tone level of the first image, and convert the first image to the second image responsive to the modulation value and the mapping function, wherein the processor is configured to scale down the first image based on the modulation value, and to convert the scaled first image to the second image based on the mapping function.

The present principles also provide a computer readable storage medium having stored thereon instructions for converting a first image to a second image according to the methods described above.

DETAILED DESCRIPTION

The present principles are directed to method and apparatus for adapting the dynamic range of an input image I to another range that is compatible with representation of an image format, usually supporting a lower dynamic range than the input image. In the following discussions, we assume that the input image is an HDR image, and the output image at a lower dynamic range is an SDR image. More generally, the present principles can be applied to conversions between any dynamic ranges. In the present application, we use the terms "image," "frame" and "picture" interchangeably to identify a sample array, often containing values for multiple components.

Figure 1:
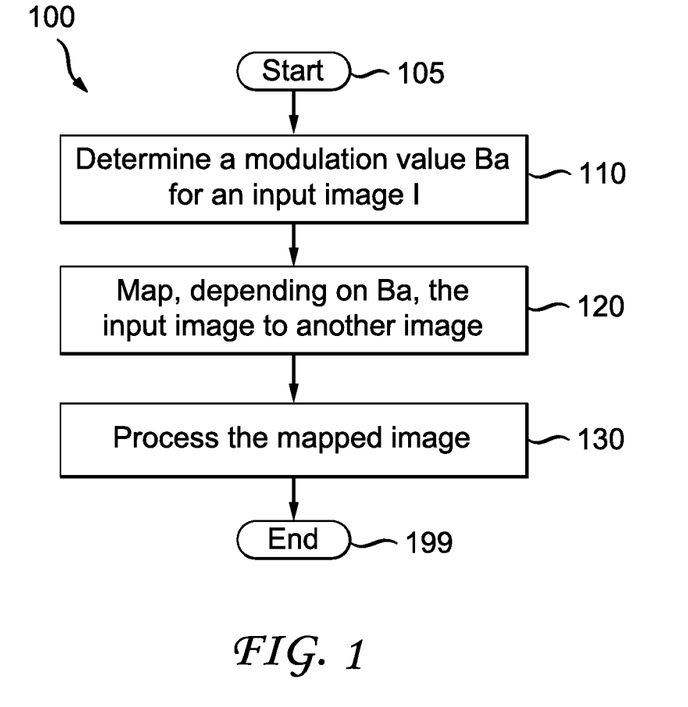
FIG. 1 is a flowchart illustrating an exemplary method for converting an HDR image to an SDR image, according to an embodiment of the present principles.

FIG. 1 illustrates an exemplary method 100 for converting an HDR image to an SDR image according to the present principles. Method 100 starts at step 105. At step 110, it determines a single modulation value Ba for the whole HDR image I. In one embodiment, the modulation value Ba is representative of the mid-tone value of the image I such that the normalized luminance Y (i.e., Y/Ba) is essentially centered around the value 1.

At step 120, the input HDR image I is converted to an SDR image depending on the modulation value. In one embodiment, the adaptation of ranges may be formulated as:

$$\pi_{Ba}:[0,P] \to R, \qquad (1)$$

where P is the maximum brightness (1000 nits for instance) of a pixel allowed by the input HDR format. The mapping $\pi_{Ba}$ can be decomposed as follows:

$$\pi_{Ba}: Y \in [0,P] \mapsto Y/Ba \in [0,P/Ba] \mapsto g(Y/Ba) \in R. \qquad (2)$$

That is, the luminance Y of the HDR image is first normalized by Ba, and then mapped to the range represented by R, for example, using a function g( ), where g( ) is a function possibly depending on Ba, i.e., g( )=$g_{Ba}$( ) and the function g( ) may map 1 to the middle value of the data range R. The mapped image is then processed at step 130, for example, encoded and transmitted. Method 100 ends at step 199.

When determining the modulation value, we assume the function g( ) is pre-determined. In the following, we describe an exemplary function g( ) that can be used for range conversion.

Function $g_{Ba}$ ( ) for Range Conversion

In the present application, we refer to each possible value in the SDR data range R as a codeword, and the maximum codeword value as $M_{SDR}$. For example, if the output image is represented as 10-bit, R=[0, 1023], the codewords are 0, 1, 2, . . . , 1023, and $M_{SDR}$=1023.

During the image conversion, we expect that the peak brightness P is mapped to the maximum codeword value in order to fully benefit from the SDR range, i.e., we have $$\pi_{Ba}(P)=M_{SDR} \text{ for all } Ba \qquad (3)$$

In a preferred embodiment, g can be defined as $$g_{Ba}(z)=M_{SDR}f(z)/f(P/Ba)=f(z)/N(Ba) \qquad (4)$$

where f( ) is a function and N(Ba) is a normalization term depending on Ba, $$N(Ba)=f(P/Ba)/M_{SDR}. \qquad (5)$$

This ensures that the peak luminance condition is fulfilled as one gets $$\pi_{Ba}(P)=g_{Ba}(P/Ba)=M_{SDR}f(P/Ba)/f(P/Ba)=M_{SDR}. \qquad (6)$$

In one embodiment, function f( ) can be an Slog function defined by $$f(z)=a \ln(b+z)+c \qquad (7)$$

wherein the parameters a, b and c of the Slog function f( ) can be determined such that f(0)=0,
f(1)=1, and
the derivative at 1 is the same as the derivative of a gamma function, i.e. f'(1)=γ.

Using these three conditions, we can get the three parameters a, b and c as functions of γ, i.e., a(γ), b(γ) and c(γ). Some exemplary values of a, b and c are shown in TABLE 2.

TABLE 2

| γ | a | b | c |
|---|---|---|---|
| 1/2.0 | 0.6275 | 0.2550 | 0.8575 |
| 1/2.4 | 0.4742 | 0.1382 | 0.9386 |
| 1/2.8 | 0.3861 | 0.0811 | 0.9699 |

Figure 2:
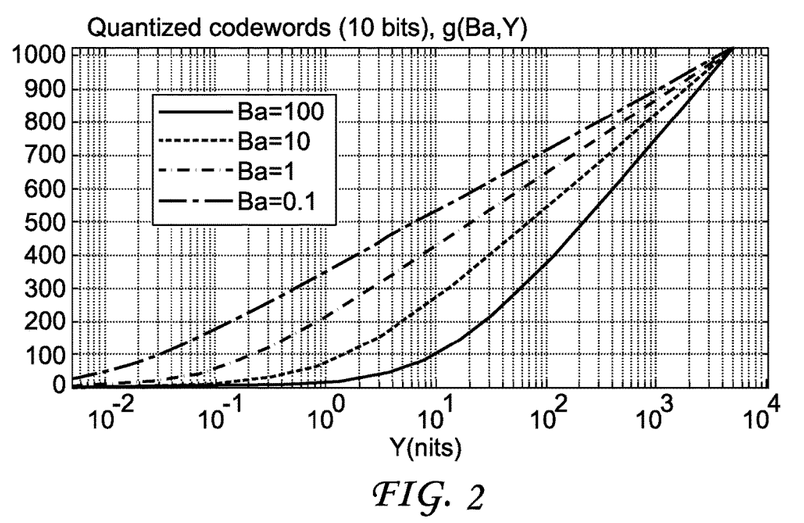
FIG. 2 illustrates pictorial examples of functions mapping HDR luminance to SDR luminance, according to an embodiment of the present principles.

Extensive tests show that a value γ close to 1/2.5 provides good image quality for the mapped image $\pi_{Ba}$ (I) when P=5000 nits and the SDR image is represented in a 10-bit format, i.e., $M_{SDR}$=1023. Thus, parameters a, b and c can be set to a=0.4495, b=0.1212 and c=0.9485. The corresponding functions $\pi_{Ba}$ are shown in FIG. 2. As can be seen from FIG. 2, the mapping curve adapts to the modulation value Ba, which usually increases as the HDR image gets brighter in general. For a larger modulation value, the mapping curve preserves more details in the bright areas because its derivative near the peak luminance is large, and for a lower modulation value, the mapping curve preserves more details in the darkest areas because it drops to zero slowly for very small values of Y.

In the following, we discuss different methods of determining the modulation value.

Determination of Ba by Mid-Tone Optimization

Figure 3:
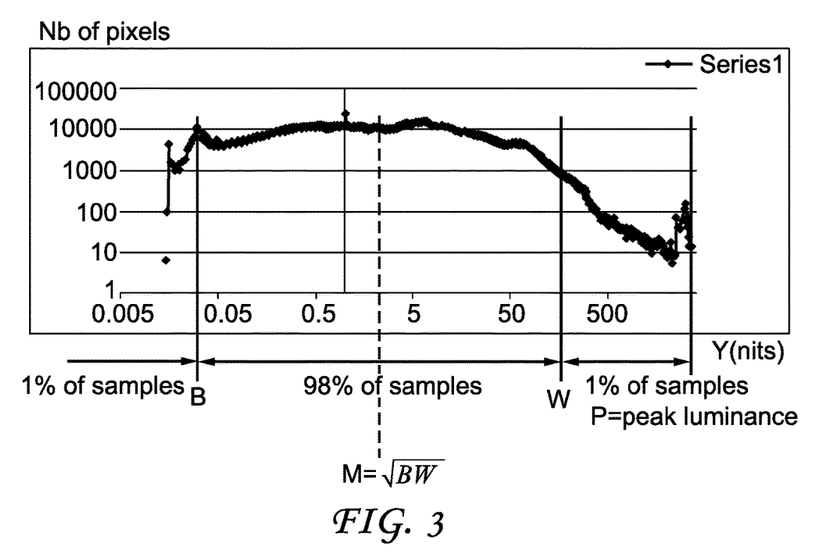
FIG. 3 is a pictorial example showing the black level, white level and mid-tone of an image using a histogram.

In one embodiment, for a whole image, pixels of the HDR image are classified into a histogram depending on their linear luminance Y, as shown in an exemplary histogram in FIG. 3. As shown in FIG. 3, the rightmost of the histogram is at peak luminance P. This peak luminance is assumed to be provided by the system level, for example, based on the image format, and not to vary from frame to frame.

We define the white level W as the luminance level corresponding to the last percentile of the histogram, the black level B as the luminance level corresponding to the first percentile of the histogram, and the mid-tone level as the geometric mean (or logarithmic mean) of the black level and the white level:

$$M:=\sqrt{BW} \qquad (8)$$

As a consequence, the three levels W, B and M depend on the content of the image.

In general, the choice of the modulation value and the mapping function should preserve information at the very dark level and also preserve details in the mid-tone range (i.e., the neighborhood of the mid-tone value). Thus, we use two conditions when deriving the modulation value: (1) the blacks are not clipped down to zero too aggressively; and (2) the number of codewords in the SDR image used to represent the mid-tone range of the HDR image is maximized.

Figure 4:
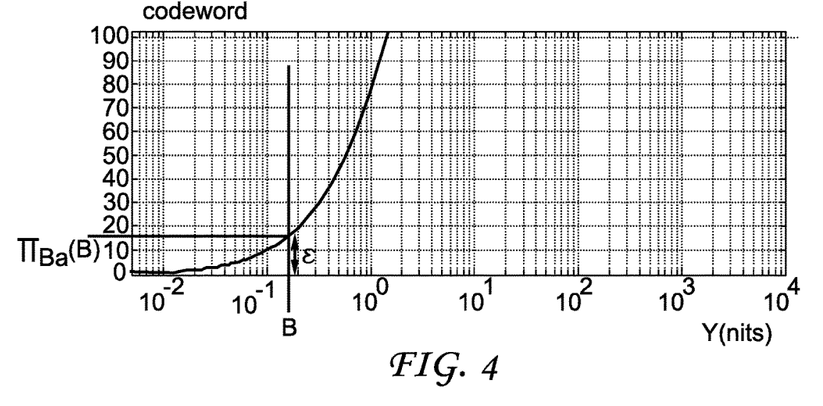
FIG. 4 is a pictorial example showing that the black level is mapped to a codeword exceeding a threshold, according to an embodiment of the present principles.

Considering the first condition that blacks should not be clipped down to zero too aggressively, we set a lower bound for the black level, i.e., $$\pi_{Ba}(B) \geq \varepsilon \qquad (9)$$

where ε is a parameter. In FIG. 4, we use an exemplary function $\pi_{Ba}$ to illustrate that we set the mapped value $\pi_{Ba}$ (B) to ε. The inequality (9) does not determine a specific modulation value Ba. Instead, it provides a range of acceptable values for Ba.

Figure 5:
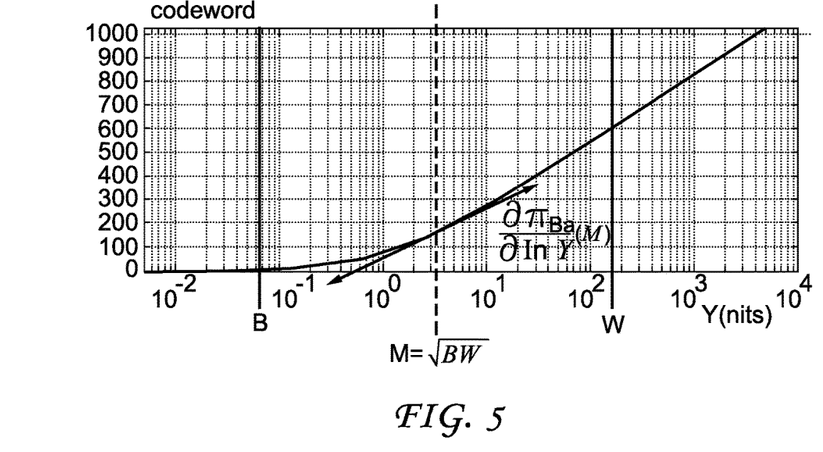
FIG. 5 is a pictorial example showing that the number of codewords used to encode the mid-tone range is maximized, according to an embodiment of the present principles.

For the second condition that the number of codewords used to encode the mid-tone range should be maximized, we choose the steepest slope for $\pi_{Ba}$ at the mid-tone level M, as shown in FIG. 5.

Combining both conditions, the modulation value can be uniquely determined by solving the following maximization problem $$Ba = \text{argmax}_{\{Ba' \text{ s.t. } \pi_{Ba'}(B) \geq \varepsilon\}} \frac{\partial \pi_{Ba'}}{\partial \ln Y}(M). \qquad (10)$$

To solve the optimization problem (10) given function g( ) a systematic brute-force search of Ba in the range of acceptable Ba values may be performed to compute the value Ba for each frame. The function g( ) can be the one described in Eq. (6), and the present principles can be applied to other forms of function g( ) In Eq. (10), a log-scale is used for luminance Y as it may represent the human luminance perception better than the linear domain. In a variation, one may determine the slope based on Y instead of ln Y for simplicity.

Here, we discussed determining the modulation value based on mid-tone optimization. In other embodiments, different methods can be used to calculate the modulation value, for example, but not limited to, using an average, median, minimum or maximum value of the luminance of the image I. These operations may be performed in the linear luminance domain or in a non-linear domain such as ln(I) or $I^\gamma$ with γ<1.

To further improve the mapping curves, some bounds can be imposed on the Ba value in order to avoid over-shooting in both very dark frames (Ba too low) and very bright frames (Ba too high). For example, we may set the Ba value to $$Ba_{att} = \text{Clip}_{[Ba_{min}, Ba_{max}]} Ba_{mid} + \sigma(Ba - Ba_{mid}) \qquad (11)$$

to determine an attenuated backlight $Ba_{att}$, with visually determined values $Ba_{min}=2$ nits, $Ba_{max}=50$ nits, $Ba_m m=5$ nits and the attenuation factor $\sigma=0.5$. This may provide modulation values closer to visually optimal ones, as shown in Table 3, where the first image of each sequence is used for testing.

Through experiments, we obtain an interval of modulation values that optimizes the visual quality of the compressed video, and we use "low" and "high" to refer to the lower and upper bounds of an interval, respectively. As can be seen from Table 3, the intervals vary with the video sequences.

TABLE 3

Attenuation Factor = 0.5 Visual

| Sequence | BW | Found Ba | Attenuated Ba | low | high |
|---|---|---|---|---|---|
| Balloon | 45.254831 | 70.188095 | 37.594048 | 35 | 50 |
| Campagne | 215.269482 | 503.391815 | 50 | 35 | 50 |
| Cathedrale | 0.784584 | 0.637649 | 2.818825 | 4 | 4 |
| FireEater_90 | 0.450625 | 0.348304 | 2.674152 | 1 | 2 |
| FireEater_119 | 2.979355 | 2.863542 | 3.931771 | 2 | 3 |
| Market | 43.713286 | 67.502548 | 36.251274 | 35 | 50 |
| Seine | 6.498019 | 6.888589 | 5.944295 | 3 | 5 |
| Tibul2_80 | 1.36604 | 1.190355 | 3.095178 | 4 | 6 |
| Tibul2_109 | 11.712686 | 13.634524 | 9.317262 | 7 | 7 |

From the experiments, we also observe that the modulation value affects the compression performance, but not in an extremely sensitive manner. In particular, if a modulation value is close to the [low, high] interval, the compression performance is close to be visually optimal. Here, we see from Table 3 that the attenuated modulation value either falls within the [low, high] interval or is close to the interval. Thus, the modulation value determined according to the present principles is optimal or close to visually optimal ones.

From Table 3, we can also see that usually the modulation value can reflect the overall brightness level and provide an overall brightness impression of an input image. For example, the brighter the input HDR image is, the higher the single modulation value might be. Video sequences "Balloon" and "Market" consist of very bright scenes containing a sunset or scenes taken in the midday in the summer, and their modulation values are consequently higher than other sequences such as "Cathedrale" and "FireEater," which consist of very dark scenes taken inside a cathedral or at night.

Temporal Stabilization of Ba

In a video sequence, a value Ba can be computed for each frame. In order to avoid temporal inconsistency in scenes with rapid brightness changes, a temporal stabilization is desirable. Fast changing videos, like a scene showing an explosion or fireworks, may cause modulation values to vary rapidly from frame to frame and cause annoying illumination effects. For instance, we assume a scene with a static background and a sudden flash (like an explosion or fireworks) in the foreground. Due to the flash, the white W will increase, as well as M and then Ba. As can be seen from FIG. 2, when Ba is high, the mapping curve suppressed the dark more, and this may induce an unexpected sudden darkening of the background in the resulted SDR picture. To prevent such an unnatural and annoying temporal variation of the luminosity in the resulting SDR video, we propose temporal stabilization to smooth the overall luminosity variation of the SDR video.

An exponential stabilization method can be used. Let $Ba^n$ be the modulation determined at frame n, and $Ba^{t,n}$ the modulation value after temporal stabilization. We may use the following scheme $$Ba^{t,n} = \lambda Ba^n + (1-\lambda) Ba^{t,n-1} \qquad (12)$$

with $\lambda$ adapted to the frame rate. Other temporal smoothing filters may be used for stabilizing the modulation values.

In the above, we discussed converting an HDR image to an SDR image using a single modulation value. In another embodiment, we may convert the HDR image to an SDR image using an illumination map, which may represent the backlight of the HDR content.

Here, the term backlight is used by analogy with TV sets made of a color panel, such as an LCD panel, and a rear illumination apparatus, such as an LED array. The rear apparatus, usually generating white light, is used to illuminate the color panel to provide more brightness to the TV. As a consequence, the luminance of the TV is the product of the luminance of rear illuminator and the luminance of the color panel. This rear illuminator is often called "backlight."

Given the illumination map, a residual frame (i.e., the SDR frame) is then obtained by dividing the HDR frame by the illumination map. Referring back to the analogy where HDR is equal to SDR times backlight, the SDR frame could be understood as the response of the (SDR) color panel. The illumination map, which can be represented by a two-dimensional array $Ba_{map}(x,y)$, may have a lower resolution compared to the HDR image. The SDR frame can be obtained by a pixel-by-pixel division of the HDR pixels by their co-located backlight pixels, possibly after an up-sampling of $Ba_{map}(x,y)$ to match the HDR image resolution.

The SDR frame and the illumination map may have different formats from each other, for example, the illumination map may be monochrome and the SDR frame may use a Y'CbCr or an RGB format. Also, each component can have different formats (for example, Y'CbCr, YUV, RGB and XYZ).

Figure 6A:
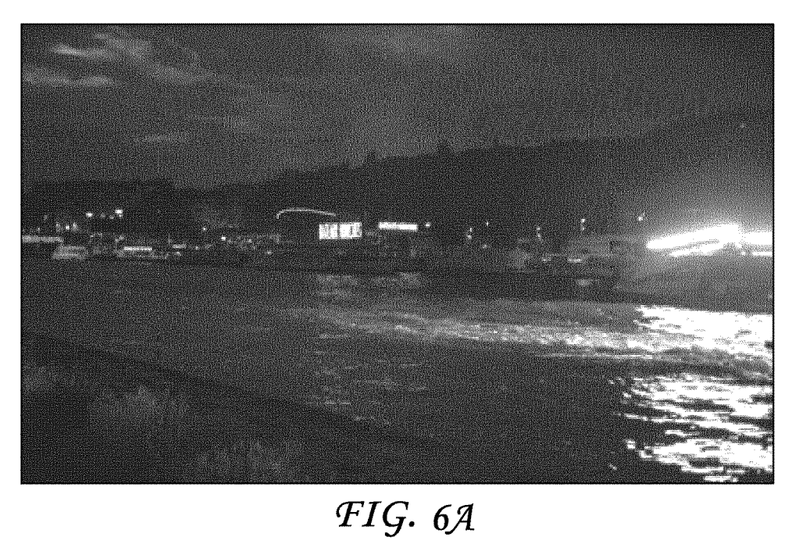
FIG. 6A is a pictorial example illustrating an exemplary RGB HDR image.
Figure 6B:
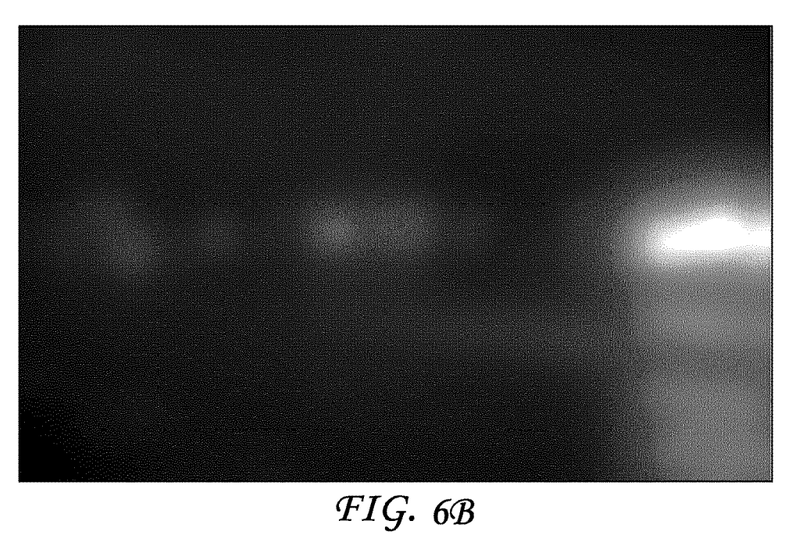
FIG. 6B is a pictorial example illustrating a corresponding illumination map.

FIG. 6A illustrates an exemplary RGB HDR image, and FIG. 6B illustrates a corresponding illumination map. As can be seen from FIG. 6A and FIG. 6B, the illumination map generally reflects the brightness level in the HDR image with more spatial smoothness than the image itself. While the single modulation value provides an overall brightness impression of the HDR image, the illumination map tracks the brightness in the HDR image at a finer granularity. Thus, we also refer to a sample in the illumination map as a local backlight value or a local modulation value. In the present application, we also refer to both the single modulation value and the illumination map as illumination information.

The conversion from HDR images to SDR images, for example, based on a single modulation value or an illumination map as discussed above, can be used in different applications, for example, but not limited to, tone mapping, compression using SDR codecs after mapping HDR to SDR and then compressing the SDR, HDR distribution that is compatible with SDR formats.

Figure 7:
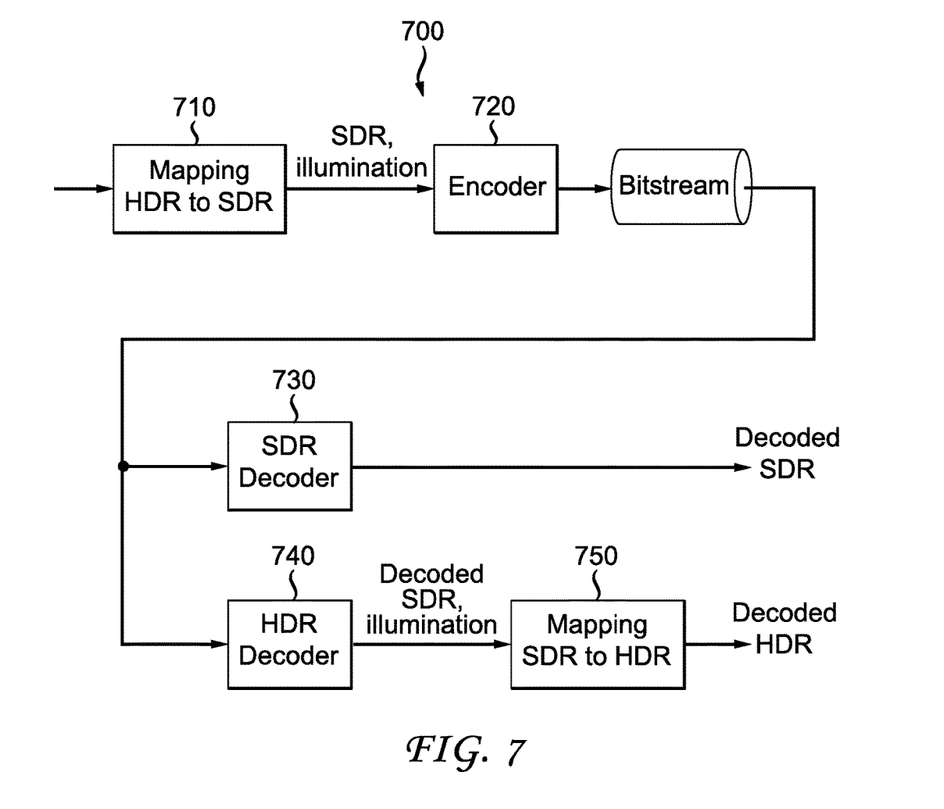
FIG. 7 illustrates an exemplary SDR/HDR distribution workflow.

FIG. 7 illustrates an exemplary SDR/HDR distribution workflow 700 that transmits HDR videos while providing backward compatibility with SDR decoders. In workflow 700, an HDR frame is processed to obtain a corresponding SDR frame and illumination information (710), for example, a single modulation value and/or an illumination map. Subsequently, both the illumination information and the SDR frame are encoded (720) into a bitstream, using, for example, but not limited to, an H.264/AVC or H.265/HEVC encoder.

At the decoding side, the SDR frame can be decoded using an SDR decoder for backward compatibility (730), which provides a decoded SDR video as output.

Alternatively, both the SDR frame and the illumination information can be decoded using an HDR decoder (740). Using the decoded SDR frame and illumination information, the SDR frame can be mapped to a decoded HDR frame (750), for example, using an inverse process of mapping $\pi_{Ba}$. The mapping from SDR to HDR (750) can also be performed by the HDR decoder (740).

In the above, various numeric values are discussed in different operations. These numeric values are for exemplary purposes and can be adjusted based on applications. For example, when the SDR video was discussed above mainly as a 10-bit video, the SDR video can also take other dynamic ranges or bit depths. The values of parameters, for example, a, b and c, or the percentiles used to determine the black level and the white levels, can also be adjusted based on the user requirements or the system configurations. In addition, when we discussed that a single modulation value is used for an entire frame, we can also have a modulation value for a picture area, for example, a slice or a tile when the picture has a very high resolution.

Figure 8:
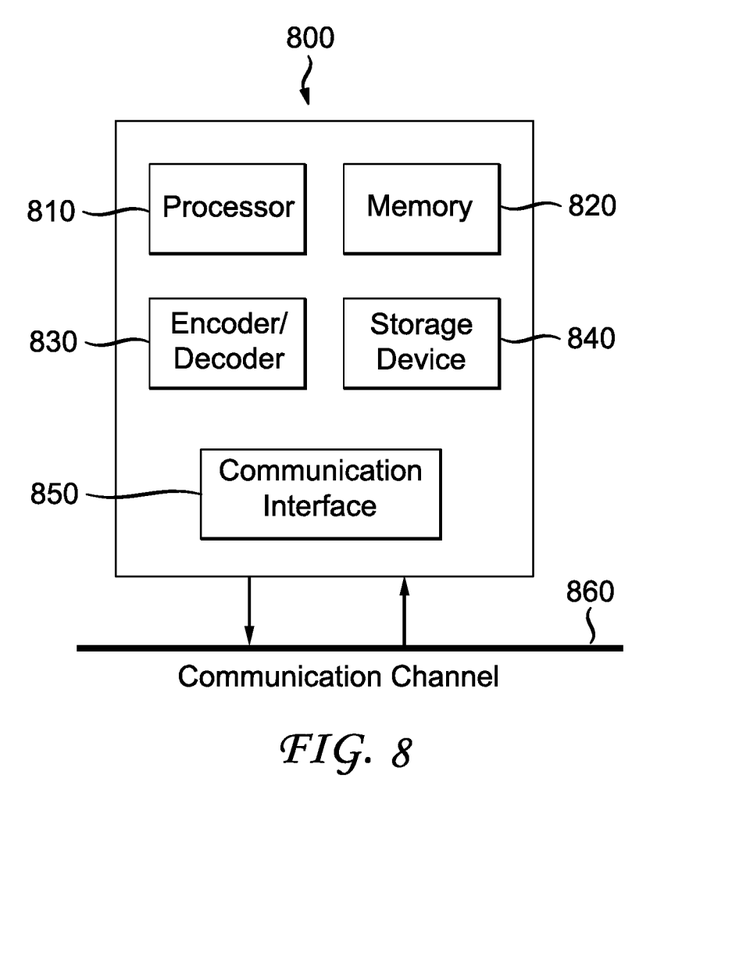
FIG. 8 illustrates a block diagram depicting an exemplary system in which various aspects of the exemplary embodiments of the present principles may be implemented.

FIG. 8 illustrates a block diagram of an exemplary system in which various aspects of the exemplary embodiments of the present principles may be implemented. System 800 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 800 may be communicatively coupled to other similar systems, and to a display via a communication channel as shown in FIG. 8 and as known by those skilled in the art to implement the exemplary video system described above.

The system 800 may include at least one processor 810 configured to execute instructions loaded therein for implementing the various processes as discussed above. Processor 810 may include embedded memory, input output interface and various other circuitries as known in the art. The system 800 may also include at least one memory 820 (e.g., a volatile memory device, a non-volatile memory device). System 800 may additionally include a storage device 840, which may include non-volatile memory, including, but not limited to, EEPROM, ROM, PROM, RAM, DRAM, SRAM, flash, magnetic disk drive, and/or optical disk drive. The storage device 840 may comprise an internal storage device, an attached storage device and/or a network accessible storage device, as non-limiting examples. System 800 may also include an encoder/decoder module 830 configured to process data to provide an encoded video or decoded video.

Encoder/decoder module 830 represents the module(s) that may be included in a device to perform the encoding and/or decoding functions. As is known, a device may include one or both of the encoding and decoding modules. Additionally, encoder/decoder module 830 may be implemented as a separate element of system 800 or may be incorporated within processors 810 as a combination of hardware and software as known to those skilled in the art.

Program code to be loaded onto processors 810 to perform the various processes described hereinabove may be stored in storage device 840 and subsequently loaded onto memory 820 for execution by processors 810. In accordance with the exemplary embodiments of the present principles, one or more of the processor(s) 810, memory 820, storage device 840 and encoder/decoder module 830 may store one or more of the various items during the performance of the processes discussed herein above, including, but not limited to the modulation value, the SDR video, the HDR video, equations, formula, matrices, variables, operations, and operational logic.

The system 800 may also include communication interface 850 that enables communication with other devices via communication channel 860. The communication interface 850 may include, but is not limited to a transceiver configured to transmit and receive data from communication channel 860. The communication interface may include, but is not limited to, a modem or network card and the communication channel may be implemented within a wired and/or wireless medium. The various components of system 800 may be connected or communicatively coupled together using various suitable connections, including, but not limited to internal buses, wires, and printed circuit boards.

The exemplary embodiments according to the present principles may be carried out by computer software implemented by the processor 810 or by hardware, or by a combination of hardware and software. As a non-limiting example, the exemplary embodiments according to the present principles may be implemented by one or more integrated circuits. The memory 820 may be of any type appropriate to the technical environment and may be implemented using any appropriate data storage technology, such as optical memory devices, magnetic memory devices, semiconductor-based memory devices, fixed memory and removable memory, as non-limiting examples. The processor 810 may be of any type appropriate to the technical environment, and may encompass one or more of microprocessors, general purpose computers, special purpose computers and processors based on a multi-core architecture, as non-limiting examples.

Figure 9:
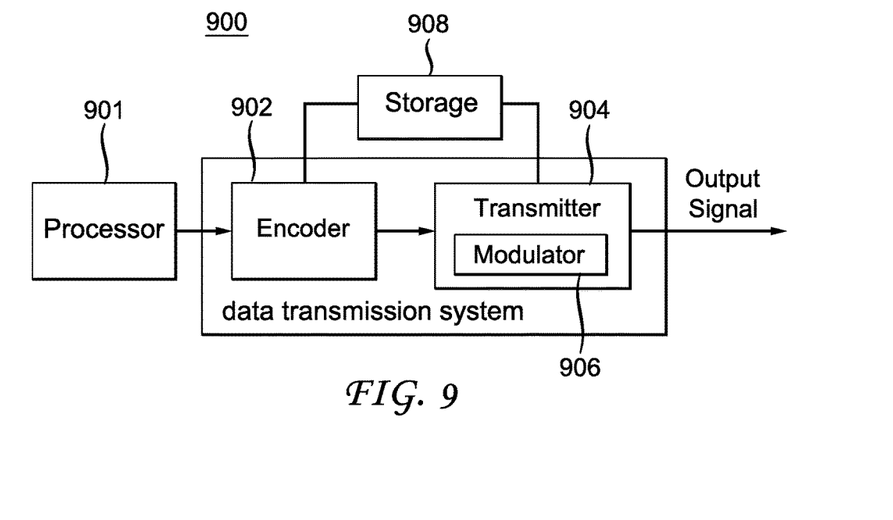
FIG. 9 illustrates a block diagram depicting an example of a video processing system that may be used with one or more implementations.

Referring to FIG. 9, a data transmission system 900 is shown, to which the features and principles described above may be applied. The data transmission system 900 may be, for example, a head-end or transmission system for transmitting a signal using any of a variety of media, such as, satellite, cable, telephone-line, or terrestrial broadcast. The data transmission system 900 also may be used to provide a signal for storage. The transmission may be provided over the Internet or some other network. The data transmission system 900 is capable of generating and delivering, for example, video content and other content.

The data transmission system 900 receives processed data and other information from a processor 901. In one implementation, the processor 901 generates the HDR video and/or represents an HDR picture using a single modulation value and an SDR picture representative of the HDR picture, for example, using method 100. The processor 901 may also provide metadata to 900 indicating, for example, the function used in the mapping curves or the values of constants.

The data transmission system or apparatus 900 includes an encoder 902 and a transmitter 904 capable of transmitting the encoded signal. The encoder 902 receives data information from the processor 901. The encoder 902 generates an encoded signal(s).

The encoder 902 may include sub-modules, including for example an assembly unit for receiving and assembling various pieces of information into a structured format for storage or transmission. The various pieces of information may include, for example, coded or uncoded video, and coded or uncoded elements. In some implementations, the encoder 902 includes the processor 901 and therefore performs the operations of the processor 901.

The transmitter 904 receives the encoded signal(s) from the encoder 902 and transmits the encoded signal(s) in one or more output signals. The transmitter 904 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 906. The transmitter 904 may include, or interface with, an antenna (not shown). Further, implementations of the transmitter 904 may be limited to the modulator 906.

The data transmission system 900 is also communicatively coupled to a storage unit 908. In one implementation, the storage unit 908 is coupled to the encoder 902, and stores an encoded bitstream from the encoder 902. In another implementation, the storage unit 908 is coupled to the transmitter 904, and stores a bitstream from the transmitter 904. The bitstream from the transmitter 904 may include, for example, one or more encoded bitstreams that have been further processed by the transmitter 904. The storage unit 908 is, in different implementations, one or more of a standard DVD, a Blu-Ray disc, a hard drive, or some other storage device.

Figure 10:
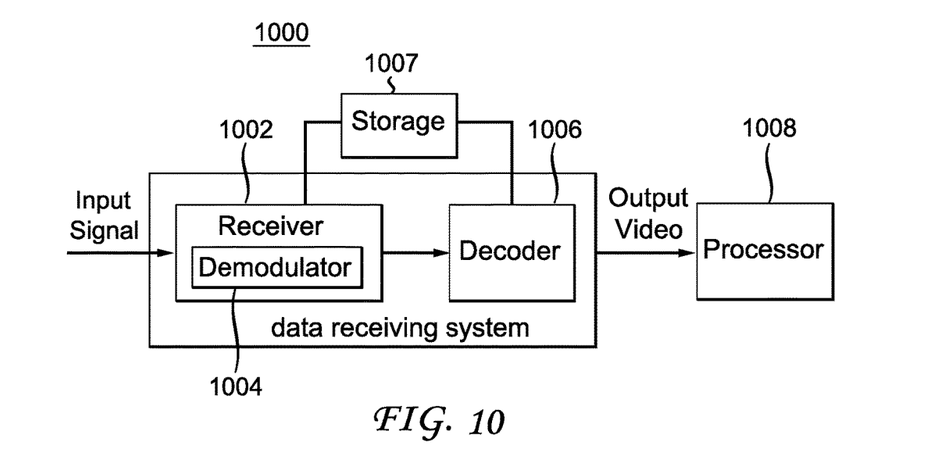
FIG. 10 illustrates a block diagram depicting another example of a video processing system that may be used with one or more implementations.

Referring to FIG. 10, a data receiving system 1000 is shown to which the features and principles described above may be applied. The data receiving system 1000 may be configured to receive signals over a variety of media, such as storage device, satellite, cable, telephone-line, or terrestrial broadcast. The signals may be received over the Internet or some other network.

The data receiving system 1000 may be, for example, a cell-phone, a computer, a set-top box, a television, or other device that receives encoded video and provides, for example, decoded video signal for display (display to a user, for example), for processing, or for storage. Thus, the data receiving system 1000 may provide its output to, for example, a screen of a television, a computer monitor, a computer (for storage, processing, or display), or some other storage, processing, or display device.

The data receiving system 1000 is capable of receiving and processing data information. The data receiving system or apparatus 1000 includes a receiver 1002 for receiving an encoded signal, such as, for example, the signals described in the implementations of this application. The receiver 1002 may receive, for example, a signal providing one or more of the HDR and SDR videos, or a signal output from the data transmission system 900 of FIG. 9.

The receiver 1002 may be, for example, adapted to receive a program signal having a plurality of bitstreams representing encoded HDR pictures. Typical receivers perform functions such as, for example, one or more of receiving a modulated and encoded data signal, demodulating the data signal from one or more carriers using a demodulator 1004, de-randomizing the energy in the signal, de-interleaving the data in the signal, and error-correction decoding the signal. The receiver 1002 may include, or interface with, an antenna (not shown). Implementations of the receiver 1002 may be limited to the demodulator 1004.

The data receiving system 1000 includes a decoder 1006. The receiver 1002 provides a received signal to the decoder 1006. The signal provided to the decoder 1006 by the receiver 1002 may include one or more encoded bitstreams. The decoder 1006 outputs a decoded signal, such as, for example, decoded video signals including video information.

The data receiving system or apparatus 1000 is also communicatively coupled to a storage unit 1007. In one implementation, the storage unit 1007 is coupled to the receiver 1002, and the receiver 1002 accesses a bitstream from the storage unit 1007. In another implementation, the storage unit 1007 is coupled to the decoder 1006, and the decoder 1006 accesses a bitstream from the storage unit 1007. The bitstream accessed from the storage unit 1007 includes, in different implementations, one or more encoded bitstreams. The storage unit 1007 is, in different implementations, one or more of a standard DVD, a Blu-Ray disc, a hard drive, or some other storage device.

The output data from the decoder 1006 is provided, in one implementation, to a processor 1008. The processor 1008 is, in one implementation, a processor configured for performing the SDR to HDR mapping. In some implementations, the decoder 1006 includes the processor 1008 and therefore performs the operations of the processor 1008. In other implementations, the processor 1008 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for converting a first image to a second image, comprising:
   determining a mid-tone level of the first image;
   determining a modulation value responsive to a mapping function and the mid-tone level of the first image; and
   converting the first image to the second image responsive to the modulation value and the mapping function, wherein the converting comprises scaling down the first image based on the modulation value, and wherein the scaled first image is converted to the second image based on the mapping function.

2. The method of claim 1, wherein the mid-tone level is determined based on a black level and a white level.

3. The method of claim 2, wherein the mid-tone level is determined as one of (1) a geometric mean and (2) a logarithm mean of the black level and the white level.

4. The method of claim 2, wherein the black level and the white level are determined based on a histogram.

5. The method of claim 2, wherein the modulation value is determined such that the conversion of the first image preserves information in a black area of the first image in the second image.

6. The method of claim 5, wherein a codeword, in the second image, corresponding to the black level in the first image exceeds a threshold.

7. The method of claim 1, wherein the first image is one of a plurality of images included in a video, and wherein the determining the modulation value is performed for each of the plurality of images, wherein the modulation values for the plurality of images are temporally smoothed.

8. The method of claim 1, wherein the determining the modulation value substantially maximizes a number of codewords used in the second image to represent a range around the mid-tone level in the first image.

9. The method of claim 8, wherein the determining the modulation value is responsive to a steepest slope of the mapping function.

10. The method of claim 1, wherein the mapping function is formulated as $g_{Ba}(z)=M_{SDR} f(z)/f(P/Ba)$, wherein P is an upper bound of a dynamic range for the first image, Ba is the modulation value, $M_{SDR}$ is an upper bound of a data range of the second image, and f( ) is a function.

11. The method of claim 10, wherein the f( ) function is an Slog function.

12. An apparatus for converting a first image to a second image, comprising:
   a communication interface configured to access the first image; and
   one or more processors configured to
      determine a mid-tone level of the first image,
      determine a modulation value responsive to a mapping function and the mid-tone level of the first image, and
      convert the first image to the second image responsive to the modulation value and the mapping function, wherein the processor is configured to scale down the first image based on the modulation value, and to convert the scaled first image to the second image based on the mapping function.

13. The apparatus of claim 12, wherein the mid-tone level is determined based on a black level and a white level.

14. The apparatus of claim 12, wherein the modulation value is determined to substantially maximize a number of codewords used in the second image to represent a range around the mid-tone level in the first image.

15. The apparatus of claim 13, wherein the mid-tone level is determined as one of (1) a geometric mean and (2) a logarithm mean of the black level and the white level.

16. The apparatus of claim 13, wherein the black level and the white level are determined based on a histogram.

17. The apparatus of claim 13, wherein the modulation value is determined such that the conversion of the first image preserves information in a black area of the first image in the second image.

18. The apparatus of claim 17, wherein a codeword, in the second image, corresponding to the black level in the first image exceeds a threshold.

19. The apparatus of claim 12, wherein the first image is one of a plurality of images included in a video, and wherein the one or more processors are configured to determine the modulation value for each of the plurality of images, wherein the modulation values for the plurality of images are temporally smoothed.

20. A non-transitory computer readable storage medium having stored thereon instructions that, when executed, implement a method for converting a first image to a second image, the method comprising:
   determining a mid-tone level of the first image;
   determining a modulation value responsive to a mapping function and the mid-tone level of the first image; and
   converting the first image to the second image responsive to the modulation value and the mapping function, wherein the converting comprises scaling down the first image based on the modulation value, and wherein the scaled first image is converted to the second image based on the mapping function.

* * * * *